UNITED STATES PATENT OFFICE.

ALBERT JAMES HOOVER, OF COLUMBUS, OHIO.

COMPOUND FOR REMOVING PAINT.

No. 902,404.  Specification of Letters Patent.  Patented Oct. 27, 1908.

Application filed November 8, 1907. Serial No. 401,320.

*To all whom it may concern:*

Be it known that I, ALBERT JAMES HOOVER, a citizen of the United States, residing at Columbus, in the county of Franklin and State of Ohio, have invented new and useful Improvements in Compounds for Removing Paint, of which the following is a specification.

This invention relates to a liquid composition for use in removing paints, varnishes and the like from wood and other painted or varnished work, and for general rubbing down and filling purposes in place of the usual method of removing paint by burning.

The object of the invention is to provide a composition which consists of few ingredients and yet will soften and remove the paint or varnish as thoroughly and effectually as compositions made up in the customary manner of a large number of ingredients, and which will leave the surface of the wood or other material from which the paint or varnish has been removed clean, dry and smooth to receive a new coat.

In the preparation of my improved composition, I employ a mixture of alcohol, benzol and Venice turpentine, combined substantially in the following proportions, to wit: alcohol, ½ galllon (64 parts); benzol, ½ gallon (64 parts); and Venice turpentine, 2 ounces (2 parts). The alcohol and benzol are first mixed and the Venice turpentine dissolved therein. The mixture is then ready for use.

Practical use has shown that my composition possesses peculiar softening and dissolving powers, whereby the most refractory paints and varnishes may be quickly and cleanly removed, leaving the surface dry and smooth for the reception of a new coat. The benzol combined with the alcohol furnishes a fairly effective solution, but one not nearly so effective as when the Venice turpentine is used therewith, the turpentine not only promoting the solvent action of the alcohol and benzol but also serving to rapidly soften the hardened paint and at the same time to retard the evaporation of the alcohol, thus providing a solution which may be stored with less loss from evaporation for any given time. As a result, a composition is produced which enables even old and hardened paints and varnishes to be quickly and cleanly removed, and which has been found, by test, to be more efficient, and at the same time materially less expensive, than compositions made up of a large number of ordinary and well-known solvents.

Having thus fully described the invention, what is claimed as new is:—

1. A liquid paint and varnish remover consisting essentially of a composition of alcohol, benzol and Venice turpentine.

2. A liquid paint and varnish remover comprising a composition of alcohol, 64 parts, benzol, 64 parts, and Venice turpentine, 2 parts.

In testimony whereof I affix my signature in presence of two witnesses.

ALBERT JAMES HOOVER.

Witnesses:
JOSEPH F. HAYS,
ANDY BERRINGER.